(12) United States Patent
Maeda et al.

(10) Patent No.: US 6,348,280 B1
(45) Date of Patent: *Feb. 19, 2002

(54) FUEL CELL

(75) Inventors: Hideo Maeda; Hisatoshi Fukumoto; Kenro Mitsuda, all of Tokyo (JP)

(73) Assignee: Mitsubishi Denki Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/349,233

(22) Filed: Jul. 8, 1999

(30) Foreign Application Priority Data

Dec. 24, 1998 (JP) ............................................. 10-366823

(51) Int. Cl.⁷ ......................... H01M 2/14; H01M 2/18; H01M 8/10
(52) U.S. Cl. ............................. 429/38; 429/34; 429/39; 429/32
(58) Field of Search ............................. 429/34, 38, 39, 429/32

(56) References Cited

U.S. PATENT DOCUMENTS 5,484,666 A    1/1996  Gibb et al. ..................... 429/34
5,902,692 A  * 5/1999  Batawi .......................... 429/34
6,066,409 A  * 5/2000  Ronne et al. .................. 429/39

FOREIGN PATENT DOCUMENTS

| EP | 0749171 A1 | * 12/1996 | ............ H01M/8/02 |
| JP | 5-94831 | 4/1993 | |
| JP | 8-306381 | 11/1996 | |

* cited by examiner

*Primary Examiner*—Mark F. Huff
*Assistant Examiner*—Daborah Chacko-Davis
(74) *Attorney, Agent, or Firm*—Oblon, Spivak, McClelland, Maier & Neustadt, P.C.

(57) ABSTRACT

There is obtained a fuel cell which has stable characteristics and produces high voltage/high output. The fuel cell uses a laminate in which single cells each including an anode, a cathode, and an electrolyte film sandwiched therebetween are sequentially stacked on each other through a separator plate. Fuel flow channels and oxidant flow channels are provided in the separator plate, and communicating holes are provided at the midway portion thereof. The flow channels in the separator plate communicate, through the communicating holes, with the flow channels in another separator plate through which the same kind of gas flows so that the same kind of gases flow into each other.

9 Claims, 7 Drawing Sheets

FUEL CELL

BACKGROUND OF THE INVENTION

1. Field of the Invention

The present invention relates to a fuel cell that generates electricity by using an electrochemical reaction which is used for, for example, an electric vehicle.

2. Description of the Related Art

A fuel cell is, as well known, a device in which a pair of electrodes are made to be brought into contact with each other through an electrolyte, a fuel is supplied to one of the electrodes, an oxidant is supplied to the other electrode, and oxidation of the fuel is made to take place electrochemically in the cell, so that chemical energy is directly converted into electrical energy.

Fuel cells have several types according to the electrolyte. In recent years, as a fuel cell capable of obtaining high output, attention has been paid to a solid polymer type fuel cell which uses a solid polymer electrolyte film as an electrolyte. For example, when a hydrogen gas as a fuel is supplied to an anode, an air as an oxidant is supplied to a cathode, and an electric current is extracted from an external circuit, reactions as indicated by the following chemical equations take place.

Anode reaction: $H_2 \rightarrow 2H^+ + 2e^-$ (1)

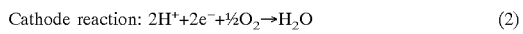

Cathode reaction: $2H^+ + 2e^- + \frac{1}{2}O_2 \rightarrow H_2O$ (2)

At this time, hydrogen is transformed into a proton at the anode, moves, together with water, to the cathode through the electrolyte, and reacts with oxygen on the cathode to produce water. Thus, for the operation of the foregoing fuel cell, it becomes necessary to supply and exhaust a reaction gas such as a hydrogen gas and air, and to extract an electric current.

A separator plate for extracting an electric current from a fuel cell and for enabling the reaction gas and water to effectively flow is disclosed in, for example, Japanese Patent Application Laid-open No. Hei 3-206763 (U.S. Pat. No. 5,108,849).

FIG. 10 is a sectional view for explaining a conceptual structure of a single cell in a fuel cell disclosed in Japanese Patent Application Laid-open No. Hei 3-206763 (U.S. Pat. No. 5,108,849). In the drawing, reference numerals 1 and 2 denote conductive separator plates, 3 denotes a cathode, 4 denotes an anode, and 5 denotes an electrolyte body using, for example, a proton conductive solid polymer. The electrolyte body 5, the cathode 3, and the anode 4 constitute a single cell. Reference numeral 10 denotes a plurality of oxidant flow channels which are formed on one surface of the separator plate 1, like bellows grooves in parallel with each other, and are for supplying, for example, an air as an oxidant to the cathode 3, and 11 denotes a plurality of fuel flow channels which are formed on the separator plate 2, like bellows grooves, and are for supplying, for example, a hydrogen gas as a fuel to the anode 4.

FIG. 11 is an explanatory view showing the upper surface of the separator plate 1 in the conventional fuel cell shown in FIG. 10. Hereinafter, the explanation will be made using FIG. 10 together with FIG. 11.

Reference numeral 20 denotes a major surface of the separator plate 1, 21 denotes an electrode support portion for supporting the electrode 3 at the separator plate 1, 22 denotes an oxidant supply opening which is formed in the separator plate 1 and is for supplying air as the oxidant, 23 denotes an oxidant exhaust opening for exhausting air, 24 denotes a fuel supply opening for supplying the fuel, and 25 denotes a fuel exhaust opening for exhausting the fuel.

In the separator plates 1 and 2, the oxidant flow channels 10 and the fuel flow channels 11 are made of spaces each surrounded with a groove which is formed by cutting the major surface, and the electrode 3 or 4.

The operation of the fuel cell will be hereinafter described with reference to FIGS. 10 and 11.

The air supplied from the air supply opening 22 of the separator plate 1 is supplied to the cathode 3 while flowing through the plurality of parallel oxidant flow channels 10. On the other hand, similarly to the oxidant, the hydrogen gas is supplied to the anode 4 through the fuel flow channels 11. At this time, since the cathode 3 and the anode 4 are electrically connected to the outside, the reaction of the chemical equation (2) takes place at the side of the cathode 3, and unreacted air, nitrogen gas and water are exhausted through the oxidant flow channels 10 to the oxidant exhaust opening 23.

At this time, the reaction of the chemical equation (1) takes place at the side of the anode 4, and unreacted hydrogen gas is similarly exhausted through the fuel flow channels 11 to the fuel exhaust opening 25. Electrons obtained by the reaction flow from the electrodes 3 and 4 via the electrode support portion 21 and through the separator plates 1 and 2.

In the conventional separator plates, it is designed such that a gas flow speed is made fast so that the produced water can be exhausted. However, if one of the plurality of flow channels is blocked, it becomes impossible to generate electricity at the electrode surface for which the one of the flow channels has responsibility, so that there has been such a case that a reaction area is substantially reduced and the characteristics are lowered.

In a laminate in which a plurality of cells are stacked on each other, there has been a problem that in the case where a deficiency of fuel occurs in even one cell of the laminate, corrosion occurs in carbon as a structural member of the electrode, separator plate, or the like as shown in the following chemical equation (3), so that fatal damage is produced and efficiency of electric power generation is extremely lowered.

$C + 2H_2O \rightarrow CO_2 + 4H^+ + 4e^-$ (3)

Besides, for the purpose of unifying a reaction distribution on a cell surface, and in order to disperse a load applied to the cell surface, such a contrivance has been made that a plurality of through holes are provided in an electrode effective surface and fastening is made as disclosed in U.S. Pat. No. 5,484,666. However, since the plurality of holes are provided in the electrode, there has been such problems that a gas flow channel becomes complicated, and a surplus area loss is increased by a gas seal or the like.

SUMMARY OF THE INVENTION

The present invention has been made to solve such problems, and an object of the invention is to provide a fuel cell which has stable characteristics and produces high voltage/high output.

According to a first aspect of the present invention, a fuel cell is comprised of a laminate in which single cells each including an anode, a cathode, and an electrolyte film sandwiched therebetween, are sequentially stacked on each other through a separator plate provided with fuel flow channels for supplying a fuel fluid to the anode and oxidant flow channels for supplying an oxidant fluid to the cathode, wherein a midway portion of the flow channels of the separator plate is provided with a communicating hole communicating with the flow channels of another separator plate for the same kind of fluid, so that on the way of reactions of the fuel and the oxidant, the same kind of fluids flow into each other through the communicating hole.

According to a second aspect of the present invention, in the fuel cell of the first aspect, a cross sectional area of the flow channel at a downstream side with respect to the communicating hole in the separator plate is smaller than a cross sectional area of the flow channel at an upstream side.

According to a third aspect of the present invention, in the fuel cell of the first or the second aspect of the present invention, an area of the anode supplied with the fuel flowing through the fuel flow channels at a downstream side with respect to the communicating hole in the separator plate is smaller than an area of the anode supplied with the fuel flowing through the fuel flow channels at an upstream side.

According to a fourth aspect of the present invention, in the fuel cell of any one of the first to the third aspects of the present invention, the fuel flow channels at a downstream side with respect to the communicating hole in the separator plate are arranged on a projected surface of the oxidant flow channels at downstream region.

According to a fifth aspect of the present invention, a fuel cell is comprised of a laminate in which single cells each including an anode, a cathode, and an electrolyte film sandwiched therebetween, are sequentially stacked on each other through a separator plate provided with fuel flow channels for supplying a fuel fluid to the anode and oxidant flow channels for supplying an oxidant fluid to the cathode, wherein a shaft is inserted in a through hole provided at a centrobaric position within a surface of the electrode and passing through the laminate, an elastic body with an area of 20 to 80% of the area of the electrode is provided around the shaft, and a compressive surface pressure is applied between both end portions of the laminate with the shaft as an axis to fasten the laminate.

According to a sixth aspect of the present invention, in the fuel cell of the fifth aspect of the present invention, a midway portion of the flow channels of the separator plate is provided with a communicating hole communicating with the flow channels of another separator plate for the same kind of fluid.

According to a seventh aspect of the present invention, in the fuel cell of the sixth aspect of the present invention, the communicating hole is provided at the centrobaric position within the surface of the electrode and is made the through hole passing through the laminate.

The fuel cell of the first aspect of the present invention uses the laminate in which single cells each including the anode, the cathode, and the electrolyte film sandwiched therebetween, are sequentially stacked on each other through the separator plate.

The separator plate is provided with the fuel flow channels and the oxidant flow channels such that the fuel fluid and the oxidant fluid are supplied to the respective electrodes while flowing, and further, the midway portion of the flow channels is provided with the communicating hole communicating with the flow channels of another separator plate for the same kind of fluid.

By the communicating hole, since the same kind of fluids flow into each other on the way of reaction of the fuel and the oxidant on the electrode, even if a flow channel at either one of an inlet side and an outlet side of a confluent point is blocked, the fluid can flow through the other flow channel, so that the fuel or oxidant can be made to flow, fluctuation of cell characteristics of the laminate can be made small, and stable and high characteristics can be obtained.

In the fuel cell of the second aspect of the present invention, the cross sectional area of the flow channel at the downstream side with respect to the communicating hole in the separator plate is smaller than the cross sectional area of the flow channel at the upstream side. Thus, even if the volume of the fuel or oxidant is decreased by reactions at the downstream side, since the cross sectional area of the flow channel is small, it is possible to keep the flow rate almost equal to that at the upstream side and the flow rate of the reaction gas in the laminate can be stably kept. Thus, fluctuation of cell characteristics of the laminate can be made small and stable and high characteristics can be obtained.

In the fuel cell of the third aspect of the present invention, the area of the anode supplied with the fuel flowing through the fuel flow channels at the downstream side with respect to the communicating hole in the separator plate is smaller than the area of the anode supplied with the fuel flowing through the fuel flow channels at the upstream side. Thus, even if fluctuation in the amount of fuel exists in the laminate and a difference in concentration of fuel is produced at a former side (upstream side) of the communicating hole of the separator plate, a distribution in concentration is smoothed at the communicating hole, and at the downstream side, since the electrode area is small, the fuel flows uniformly into the laminate and stable and high characteristics can be obtained.

In the fuel cell of the fourth aspect of the present invention, for example, when the oxidant flow channels are provided on a surface of the separator plate opposite to the surface on which the fuel flow channels are provided, and the fuel flow channels at the downstream side with respect to the communicating hole in the separator plate are arranged on the projected surface of the oxidant flow channels at the downstream region (for example, an exhaust opening region of the oxidant flow channels from the separator plate), since downstream regions where the concentration of the oxidant and the fuel supplied to the cathode and the anode becomes low are coincident with each other, the amount of reaction at the downstream side is relatively decreased, so that the possibility of deficiency of fuel becomes low, and stable and high characteristics can be obtained.

The fuel cell of the fifth aspect of the present invention uses the laminate in which single cells each including the anode, the cathode, and the electrolyte film sandwiched therebetween, are sequentially stacked on each other through the separator plate. The separator plate is provided with the fuel flow channels and the oxidant flow channels such that the fuel fluid and the oxidant fluid are supplied to the respective electrodes while flowing. Further, the through hole passing through the laminate is provided at the centrobaric position within the surface of the electrode, the shaft is inserted in the through hole, the elastic body with an area of 20 to 80% of the area of the electrode is provided around the shaft, and a compressive surface pressure is applied between both end portions of the laminate with the shaft as an axis to fasten the laminate. Thus, it is possible to uniformly apply a ring-shaped surface pressure to the effective surface of the electrode surface.

In the fuel cell of the sixth aspect of the present invention, the separator plate is provided with the fuel flow channels or oxidant flow channels such that the fuel or oxidant flows and is supplied to the respective electrodes, and the midway portion of the flow channels is provided with the communicating hole communicating with the flow channels of another separator plate for the same kind of fluid. The ring-shaped surface pressure is uniformly applied to the electrode surface, and the fluid can flow together with the same kind of fluid in another separator plate in the laminate, so that fluctuation of cell characteristics of the laminate is small, and stable and high characteristics can be obtained.

In the fuel cell of the seventh aspect of the present invention, the communicating hole is provided at the centrobaric position within the surface of the electrode and is made the through hole passing through the laminate. Since the hole for the fastening shaft and the communicating hole can be made the same, the structure becomes simple.

DETAILED DESCRIPTION OF THE PREFERRED EMBODIMENTS

Preferred embodiments of the present invention will now be described with reference to the drawings.

Embodiment 1

Figure 1:
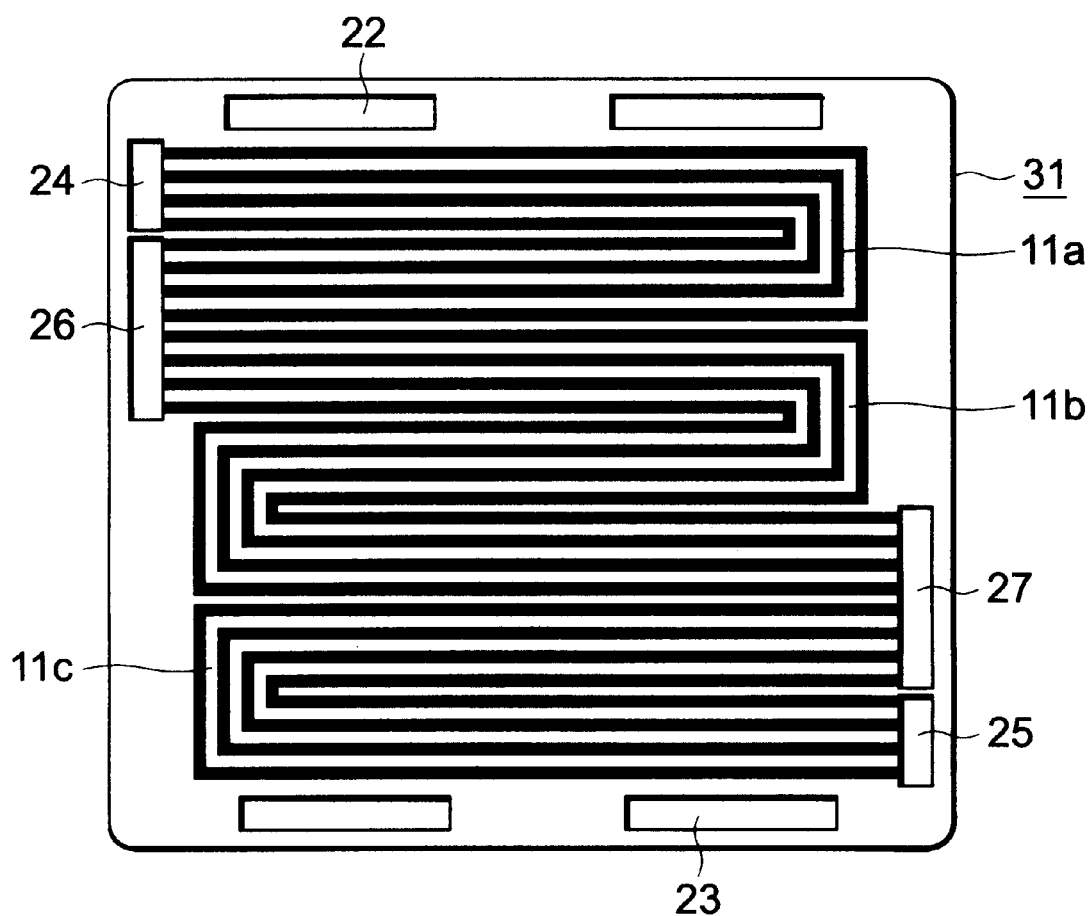
FIG. 1 is a plan view of a separator plate according to a first embodiment of the present invention.

FIG. 1 is a plan view of a surface of a separator plate 31 in a laminate used in a fuel cell of this embodiment of the present invention, on which fuel flow channels are provided. In the drawing, reference numeral 22 denotes an oxidant supply opening, 23 denotes an oxidant exhaust opening, 24 denotes a fuel supply opening, 25 denotes a fuel exhaust opening, 26 denotes a first communicating hole provided at an upstream side in the flow of fuel from the fuel supply opening 24 to the fuel exhaust opening 25, 27 denotes a second communicating hole provided at a downstream side, 11a denotes fuel flow channels (hereinafter referred to also as fuel flow channels at an upstream portion) from the fuel supply opening 24 to the first communicating hole 26, 11b denotes fuel flow channels (hereinafter referred to also as fuel flow channels at a middle portion) from the first communicating hole 26 to the second communicating hole 27, and 11c denotes fuel flow channels (hereinafter referred to also as fuel flow channels at a downstream portion) from the second communicating hole 27 to the fuel exhaust opening 25.

The operation will next be described.

The fuel supplied from the fuel supply opening 24 flows in the separator plate along the fuel flow channels 11a to 11c and goes out from the exhaust opening 25. At this time, in the first communicating hole 26 and the second communicating hole 27, the fuel flow channels communicate with fuel flow channels provided in another separator plate in the laminate, so that the fuels can flow into each other.

Here, in the separator plate 31, for example, in the case where the fuel flow channel 11a at the upstream portion is blocked by a waterdrop, electric power generation does not take place in an area of a portion where the flow channel of the fuel flow channel 11a at the upstream portion is cut. However, in the fuel flow channels 11b at the middle portion and the fuel flow channel 11c at the downstream portion, the fuel is supplied through the first communicating hole 26 or the second communicating hole 27 from another separator plate, so that electric power generation can be continued. In that case, since a current density was increased and an amount of heat generation became large in this cell, temperature arose and water in the fuel flow channel 11a at the upstream portion evaporated, and after a while, electric power generation became possible in the entire of the surface.

Incidentally, although the explanation of this embodiment has been made on the fuel flow channel, the same effect can be obtained for the oxidant flow channel as well.

Embodiment 2

Figure 2:
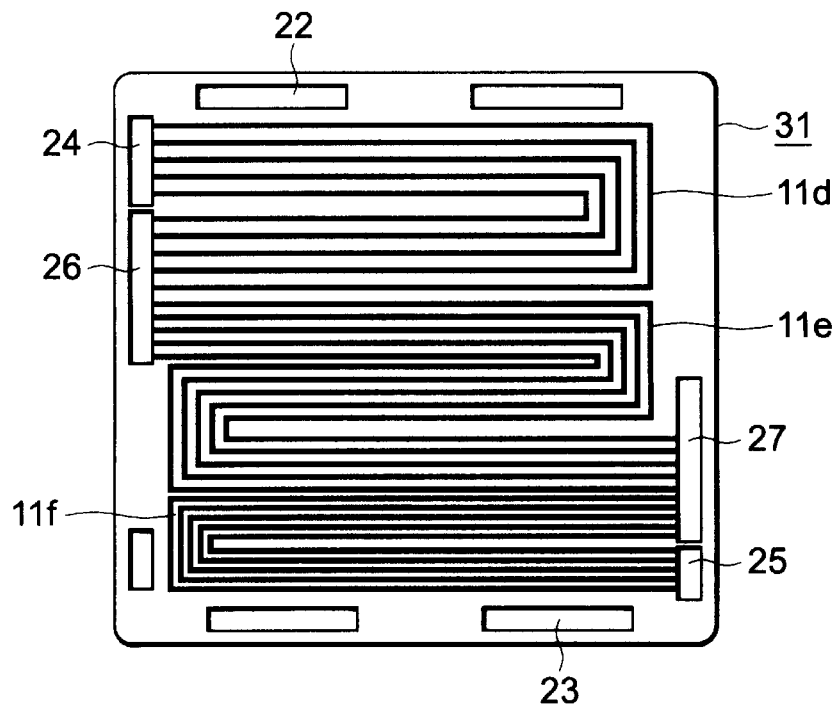
FIG. 2 is a plan view of a separator plate according to a second embodiment of the present invention.

FIG. 2 is a plan view of a surface of a separator plate 31 in a laminate used in a fuel cell of this embodiment of the present invention, on which fuel flow channels are provided. Reference numeral 11d denotes fuel flow channels (hereinafter referred to also as fuel flow channels at an upstream portion) from a fuel supply opening 24 to a first communicating hole 26, 11e denotes fuel flow channels (hereinafter referred to also as fuel flow channels at a middle portion) from the first communicating hole 26 to a second communicating hole 27, and 11f denotes fuel flow channels (hereinafter referred to also as fuel flow channels at a downstream portion) from the second communicating hole 27 to a fuel exhaust opening 25.

The effective area of an electrode is 225 cm$^2$, and the fuel flow channels 11d to 11f are parallel flow channels. The cross sectional areas of grooves of the fuel flow channel 11d at the upstream portion, the fuel flow channel 11e at the middle portion, and the fuel flow channel 11f at the downstream portion are 1.2 mm$^2$, 0.9 mm$^2$, and 0.6 mm$^2$, respectively.

The operation will next be described.

The fuel, for example, hydrogen supplied from the fuel supply opening 24 flows in the separator plate along the fuel flow channels 11d to 11f and goes out from the exhaust opening 25. At this time, in the first communicating hole 26 and the second communicating hole 27, the fuel flows together with the fuel flowing through another separator plate in the laminate.

Here, hydrogen (fuel) is consumed with its reaction, and the flow amount is decreased as the fuel flows to the downstream side. However, in this embodiment, the flow rate of the fuel from the flow channel 11d at the upstream side to the flow channel 11f at the downstream side was almost 5 m/s, and it was possible to exhaust waterdrops produced in the cell surface smoothly.

On the other hand, in the case where the cross sectional areas of the flow channels over the entire surface were unified to the area of the fuel flow channel 11d at the upstream portion, the flow rate at the fuel flow channel 11e at the middle portion and the fuel flow channel 11f at the downstream portion was decreased, and the frequency at which waterdrops were blocked was increased.

In the case where the areas of the flow channels over the entire surface were unified to the cross sectional area of the flow channel 11f at the downstream portion, although waterdrops were not blocked, a pressure loss became large, and surplus driving force became necessary.

Further, in this embodiment, although the cross sectional areas of the fuel flow channels are changed as described above, even if the number of flow channels with the same cross sectional area is changed, the same effect can be obtained.

Besides, in this embodiment, although explanation has been made on the case where two communicating holes are provided, the present invention does not depend on the number of communicating holes.

Embodiment 3

Figure 3:
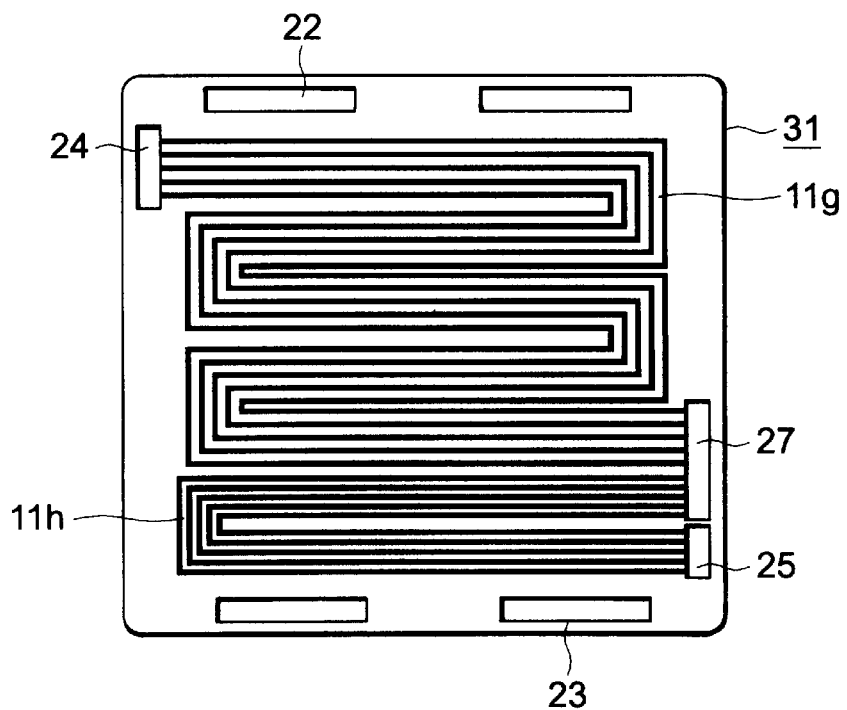
FIG. 3 is a plan view of a separator plate according to a third embodiment of the present invention.

FIG. 3 is a plan view of a surface of a separator plate 31 in a laminate used for a fuel cell of this embodiment of the present invention, on which fuel flow channels are provided. Reference numeral 11g denotes fuel flow channels (hereinafter referred to also as fuel flow channels at an upstream portion) from a fuel supply opening 24 to a communicating hole 27, and 11h denotes fuel flow channels (hereinafter referred to also as fuel flow channels at a downstream portion) from the communicating hole 27 to a fuel exhaust opening 25.

Since only one communicating hole 27 is provided at the downstream side with respect to the middle portion of the entire fuel flow channel, the area of an anode supplied with the fuel flowing through the fuel flow channels at the downstream portion with respect to the communicating hole 27 in the separator plate is smaller than the area of the anode supplied with the fuel flowing through the fuel flow channels at the upstream portion.

The effective area of the anode is 225 cm$^2$, the fuel flow channels 11g and 11h are ten parallel flow channels, the cross sectional area of a groove of each of the fuel flow channels 11g at the upstream portion is 1.2 mm$^2$, and the fuel flows for an anode area of 160 cm$^2$. The fuel flow channels 11h at the downstream portion has 0.6 mm$^2$, and the fuel flows for an electrode area of 65 cm$^2$.

The operation will next be described. The fuel, for example, hydrogen supplied from the fuel supply opening 24 flows in the separator plate along the fuel flow channels 11g and 11h, and goes out from the exhaust opening 25. At this time, in the communicating hole 27, the fuel flows together with a fuel flowing through another separator plate in the laminate.

Here, hydrogen (fuel) is consumed with its reaction, and for example, in a methanol reformed gas, although the concentration of hydrogen at the inlet is about 75% (carbonic acid 25%: dry base), the concentration is decreased toward the downstream direction, and in the case where fuel utilization is 70%, the concentration becomes 47% at the outlet 25. In the case where the reaction is uniform in the electrode surface, the concentration becomes 60% at the portion of the communicating hole 27.

Here, in the case where there is fluctuation in the flow rate of gases flowing through the respective separator plates, for example, in the case where the fluctuation in the flow rate is 10%, the concentration of hydrogen gas at the outlet in a single cell where the flow rate is small is lowered to about 37%. Thus, not only the performance is lowered, but also a deficiency of hydrogen partially occurs so that fatal damage may occur.

However, since the communicating hole is provided at the downstream side, the hydrogen concentration returns to almost the same level as that of another single cell, so that damage such as the deficiency of hydrogen can be prevented.

In the case where the communicating hole is positioned at the upstream side with respect to the middle point of the entire fuel flow channel, that is, in the case where the area of the anode supplied with the fuel flowing through the fuel flow channels at the downstream side is larger than that at the upstream side, the hydrogen concentration at the communicating hole 27 becomes 66% or more. Thus, even if the compositions of gases flowing through the respective separator plates in the laminate are averaged by the communicating hole 27, its effect is hardly obtained.

Incidentally, in this embodiment, the cross sectional area of the fuel flow channel at the downstream side with respect to the communicating hole is made smaller than that at the upstream side. However, even if the cross sectional area is the same, when the communicating hole is provided at the downstream side of the entire flow channel, the same effect can be obtained.

Embodiment 4

Figure 4A:
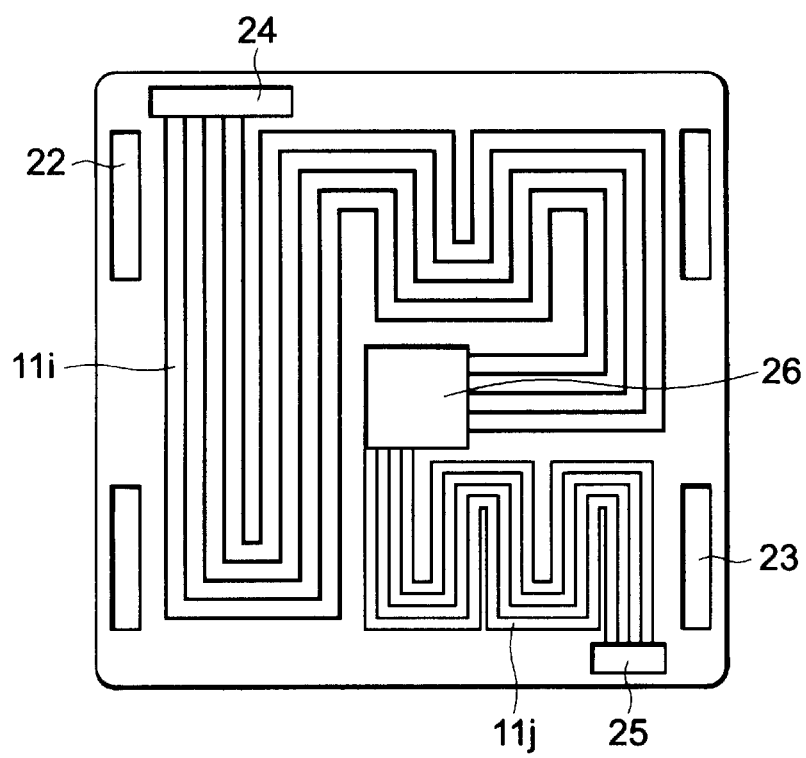
FIGS. 4A and 4B are plan views of a separator plate according to a fourth embodiment of the present invention.
Figure 4B:
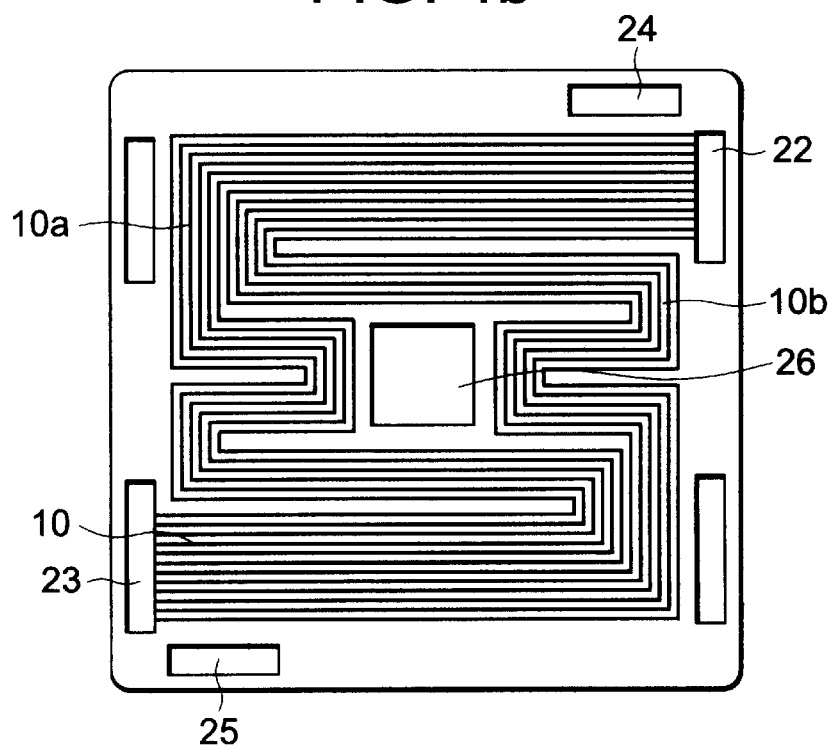

FIGS. 4A and 4B are plan views of surfaces of a separator plate 31 in a laminate used for a fuel cell of this embodiment of the present invention, on which fuel flow channels are provided and oxidant flow channels are provided, respectively. A communicating hole 26 is provided in only the fuel flow channels. In the drawing, reference numeral 11i denotes fuel flow channels (hereinafter referred to also as fuel flow channels at an upstream portion) from a fuel supply opening 24 to the communicating hole 26, and 11j denotes fuel flow channels (hereinafter referred to also as fuel flow channel at a downstream portion) from the communicating hole 26 to a fuel exhaust opening 25.

In this embodiment, on the surface of the separator plate where the fuel flow channels are provided, the area of an anode supplied with fuel flowing through the fuel flow channels 11j at the downstream side with respect to the communicating hole 26 is smaller than the area of the anode supplied with the fuel flowing through the fuel flow channels 11i at the upstream side, and a region where the fuel flow channels 11j at the downstream portion are provided is made to overlap with a projected surface of an outlet region of oxidant flow channels 10.

The effective area of the anode is 225 cm², the fuel flow channels 11*i* and 11*j* are ten parallel flow channels, the cross sectional area of a groove of each of the flow channels 11*i* at the upstream portion is 1.2 mm², and the fuel flows for an electrode area of 171 cm². The cross sectional area of a groove of each of the fuel flow channels 11*j* at the downstream portion is 0.6 mm², and the fuel flows for an electrode area of 54 cm². The air flow channels 10 are twelve parallel flow channels, and they are divided into two sets each including six flow channels on the way so to avoid the hole of the communicating hole.

The operation will next be described. The fuel supplied from the fuel supply opening 24 flows in the separator plate along the fuel flow channels 11*i* to 11*j*, and goes out from the exhaust opening 25. At this time, at the communicating hole 26, the fuel flows together with a fuel flowing in another separator in the laminate.

Here, in the fuel, hydrogen is consumed with its reaction, and for example, in a methanol reformed gas, although the concentration of hydrogen at the inlet is about 75% (carbonic acid 25%: dry base), the concentration is decreased toward the downstream direction. In the case where fuel utilization is 70%, the concentration becomes 47% at the outlet 25. In the case where the reaction is uniform in the electrode surface, the concentration becomes 58% at the portion of the communicating hole 26. However, at the upstream side, since the concentration of oxygen for the air side is also high, the amount of reaction at the upstream side reaches 88% of the entire surface, and the concentration of hydrogen at the communicating hole is lowered to 54%. However, at the downstream side, since gas consumption becomes not larger than one half of normal consumption, there hardly occurs a deficiency of gas at the downstream side, and stable operation can be made.

Embodiment 5

Figure 5:
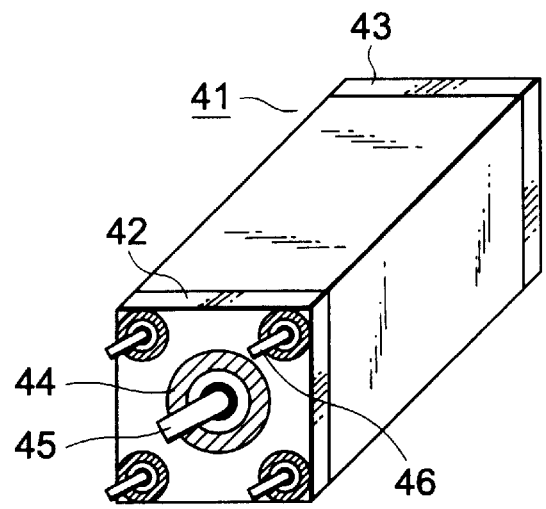
FIG. 5 is a perspective view of a fuel cell according to a fifth embodiment of the present invention.

FIG. 5 is a perspective view of a fuel cell of this embodiment of the present invention. In the drawing, reference numeral 41 denotes a fuel cell, 42 and 43 denote end plates, and 45 denotes a shaft passing through a through hole. The through hole is provided at the center of an electrode and passes through a laminate. Reference numeral 44 denotes a belleville spring as an elastic body which is provided around the shaft 45, and fastening is made by using the ring-like elastic body with the shaft 45 as an axis. Reference numeral 46 denotes a shaft at a peripheral portion.

The electrode with a square of 15 cm, and the belleville spring with an inner diameter of 64 mm, an outer diameter of 125 mm, and a plate thickness of 5 mm were used.

Figure 6:
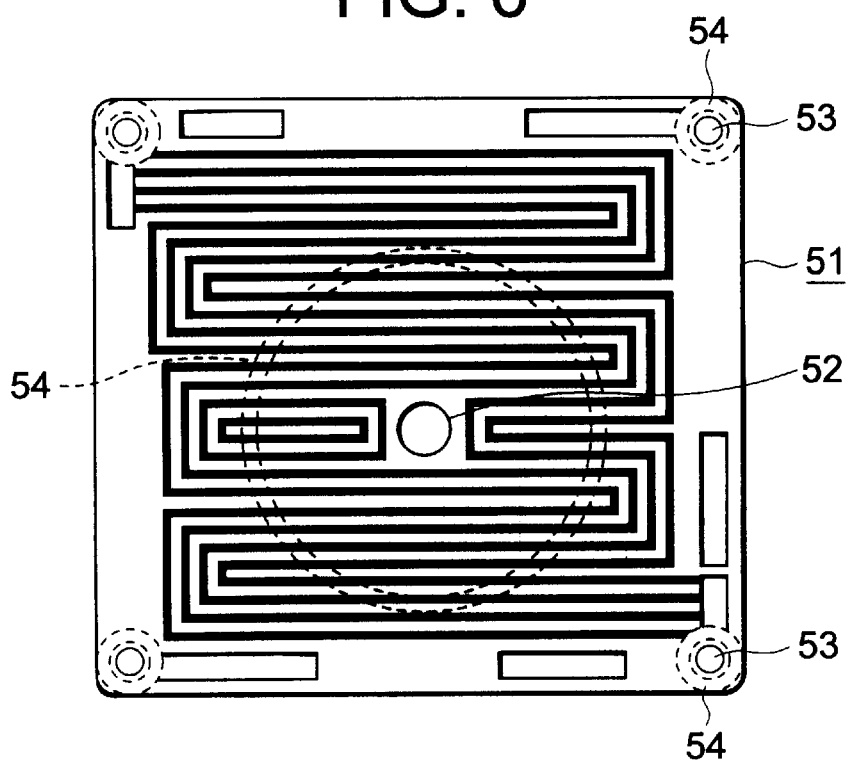
FIG. 6 is a plan view of a separator plate according to the fifth embodiment of the present invention.

FIG. 6 is a plan view of a separator plate forming a laminate used in the fuel cell shown in FIG. 5. In the drawing, reference numeral 51 denotes a separator plate, 52 denotes a through hole provided at the center portion, 53 denotes holes for four fastening rods provided at the peripheral portion, and 54 denotes a projection portion where the belleville spring abuts on the end plate.

Figure 7:
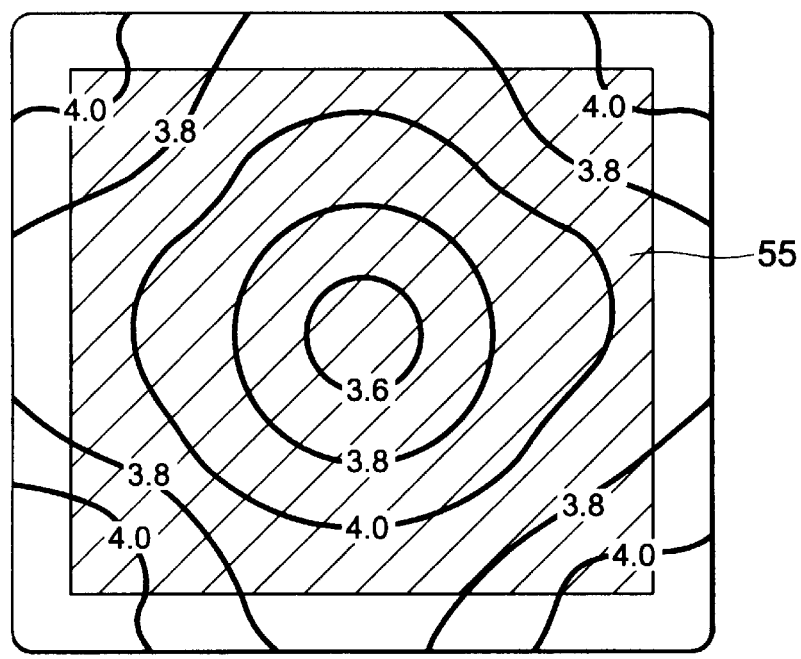
FIG. 7 is an explanatory view showing a surface pressure distribution applied to a separator portion according to the fifth embodiment of the present invention.

The operation will next be described. FIG. 7 is an explanatory view showing a surface pressure distribution applied to a separator portion just under the end plate of the laminate in the fuel cell shown in FIG. 5. In the drawing, reference numeral 55 denotes an electrode, and numerical values shown in the drawing indicate surface pressure.

That is, the surface pressure applied to the electrode portion was within the range of 3.6 kg/cm² to 4 kg/cm², and an average resistance value of a cell was 0.25 mΩ.

Figure 8:
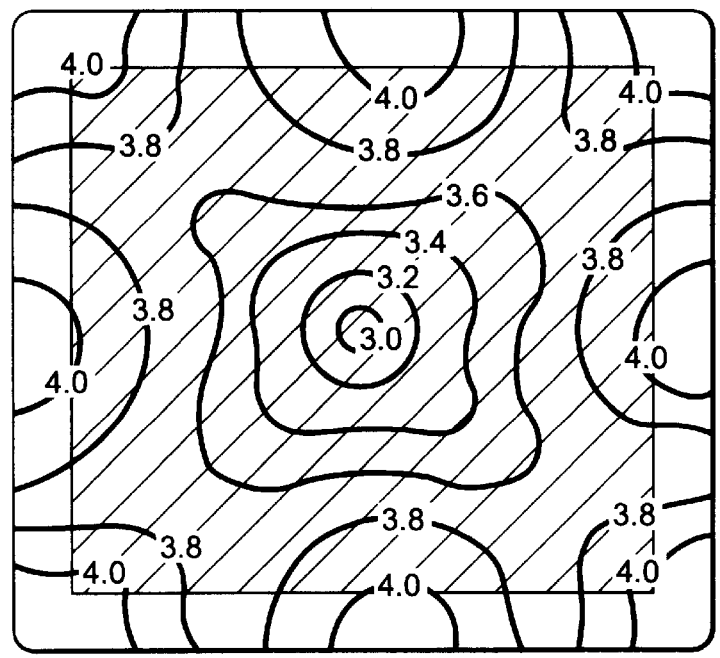
FIG. 8 is an explanatory view showing a surface pressure distribution applied to a separator portion for comparison.

On the other hand, FIG. 8 is provided for comparison and is an explanatory view showing a surface pressure distribution in the case where a through hole is not provided at the center of the electrode contrary to FIG. 5, but eight fastening portions are uniformly provided at the peripheral portion and the laminate is fastened as shown in FIG. 5. In this case, the surface pressure applied to the electrode portion had large fluctuation between 3 kg/cm² and 4 kg/cm², the surface pressure in an area average was merely 3.6 kg/cm², and a resistance value became 0.3 mΩ.

In the fuel cell shown in FIG. 5, the surface pressure distribution was measured while the diameter of the ring-like belleville spring of the elastic body 44 for fastening the center was variously changed. As a result, in the case where the ring diameter was made not shorter than 150 mm (equivalent to 80% of the area) equal to the electrode length, the fastening force at the center portion was weak and the resistance value was sharply increased. Besides, in the case where the ring diameter was made not longer than 75 mm (equivalent to 20% of the area), the force was concentrated on only the center portion, the surface pressure outside of the portion of about 2 cm inside the end of the electrode occupying a large part as an area was lowered, and the resistance value was sharply increased.

From the above, it is desirable that the area of the elastic body is 20% to 80% of the electrode area.

Embodiment 6

Figure 9:
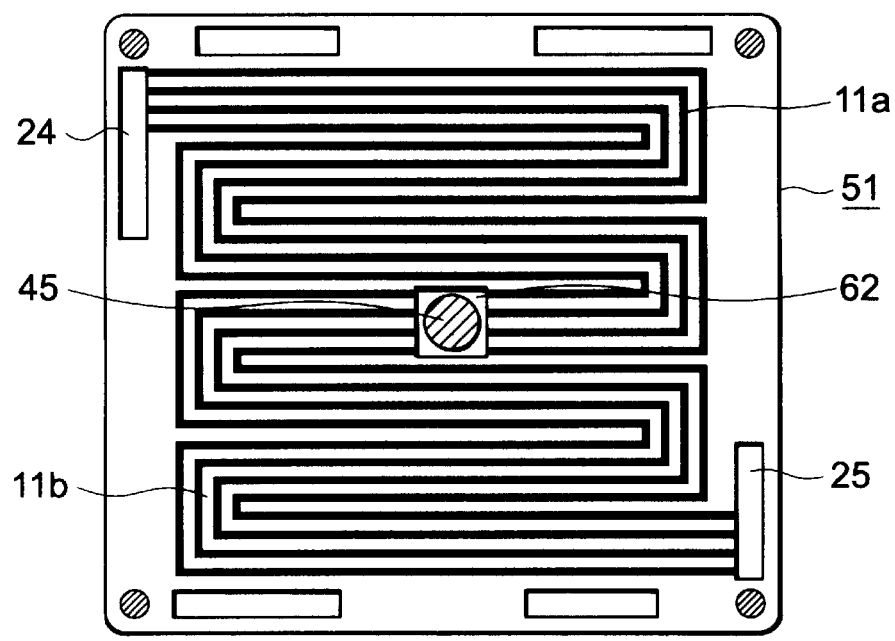
FIG. 9 is a plan view of a separator plate according to a sixth embodiment of the present invention.
Figure 10:
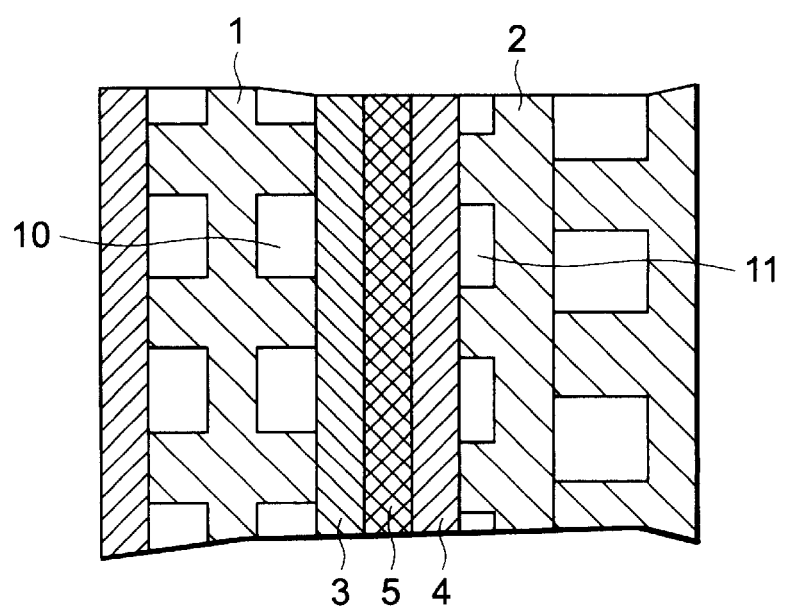
FIG. 10 is a sectional view for explaining a conceptual structure of a single cell in a conventional fuel cell.
Figure 11:
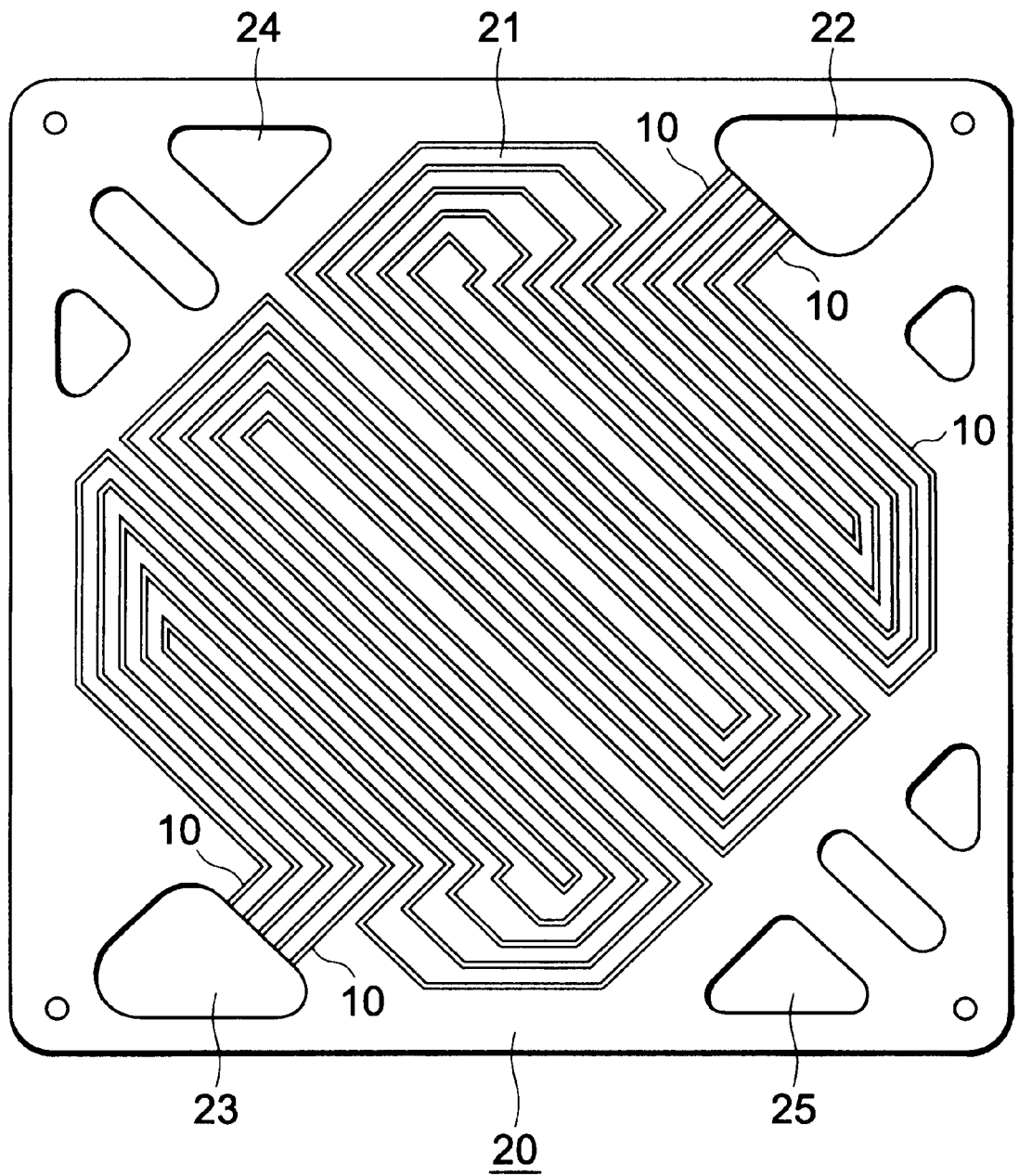
FIG. 11 is an explanatory view showing an upper surface of a separator plate in the conventional fuel cell.

FIG. 9 is a plan view of a surface of a separator plate 61 in a laminate forming a fuel cell of this embodiment of the present invention, on which fuel flow channels are provided. A communicating hole 62 is provided at the center portion of an electrode and is made a through hole passing through the laminate. The communicating hole operates similarly to the communicating hole in embodiments 1 to 4. A fastening shaft 45 is made to pass through this through hole, a ring-like elastic body is provided at the peripheral portion of this shaft, and the laminate is fastened at both end portions of the laminate.

In this embodiment, a pressure distribution becomes uniform and characteristics are improved by fastening force of a belleville spring from the center shaft, and further, decrease of a reaction area due to blocking of flow channels is suppressed by the communicating hole, so that both the fluctuation of characteristics in the laminate and the average cell characteristics can be improved.

Incidentally, in the drawings, the number of fuel flow channels and oxidant flow channels is shown for convenience, and the embodiments of the present invention are not limited to this. Besides, the number is not always coincident with the number of flow channels set forth in the embodiments.

As described above, the present invention has the following effects.

According to the fuel cell of the first aspect of the present invention, in the fuel cell comprising the laminate in which single cells each including an anode, a cathode, and an electrolyte film sandwiched therebetween, are sequentially stacked on each other through the separator plate provided with the fuel flow channels for supplying the fuel fluid to the anode and the oxidant flow channels for supplying the oxidant fluid to the cathode, the midway portion of the flow channels of the separator plate is provided with the communicating hole communicating with the flow channels of another separator plate for the same kind of fluid, and the same kind of fluids flow into each other through the communicating hole on the way of reaction of the fuel and the oxidant. Thus, stable and high characteristics can be obtained.

According to the fuel cell of the second aspect of the present invention, in the fuel cell of the first aspect of the present invention, the cross sectional area of the flow channel at the downstream side with respect to the communicating hole in the separator plate is smaller than the cross sectional area of the flow channel at the upstream side. Since the flow rate of reaction gas in the laminate can be stably kept, fluctuation of cell characteristics of the laminate is small and stable and high characteristics can be obtained.

According to the fuel cell of the third aspect of the present invention, in the fuel cell of the first or the second aspect of the present invention, the area of the anode supplied with the fuel flowing through the fuel flow channels at the downstream side with respect to the communicating hole in the separator plate is smaller than the area of the anode supplied with the fuel flowing through the fuel flow channels at the upstream side. Thus, the fuel is almost uniformly fed in each laminate, and stable and high characteristics can be obtained.

According to the fuel cell of the fourth aspect of the present invention, in the fuel cell of any one of the first to the third aspects of the present invention, the fuel flow channels at the downstream side with respect to the communicating hole in the separator plate are arranged on the projected surface of the oxidant flow channels at downstream region. Thus, stable and high characteristics can be obtained.

According to the fuel cell of the fifth aspect of the present invention, the fuel cell is comprised of the laminate in which single cells each including the anode, the cathode, and the electrolyte film sandwiched therebetween, are sequentially stacked on each other through the separator plate provided with the fuel flow channels for supplying the fuel fluid to the anode and the oxidant flow channels for supplying the oxidant fluid to the cathode, wherein the shaft is inserted in the through hole provided at the centrobaric position within the surface of the electrode and passing through the laminate, the elastic body with an area of 20 to 80% of the area of the electrode is provided around the shaft, and compressive surface pressure is applied through the elastic body between both end portions of the laminate with the shaft as an axis to fasten the laminate. Thus, the resistance is decreased and the characteristics are improved.

According to the fuel cell of the sixth aspect of the present invention, in the fuel cell of the fifth aspect of the present invention, the midway portion of the flow channels of the separator plate is provided with the communicating hole communicating with the flow channels of another separator plate for the same kind of fluid. Thus, the resistance is decreased, the characteristics are improved, and stable and high characteristics can be obtained.

According to the fuel cell of the seventh aspect of the present invention, in the fuel cell of the sixth aspect of the present invention, the communicating hole is provided at the centrobaric position within the surface of the electrode and is made the through hole passing through the laminate. Since the hole for the fastening shaft and the communicating hole can be made the same, the structure becomes simple.

What is claimed is:

1. A fuel cell comprising:
   a laminate of single cells, each of the single cells including an anode, a cathode, and an electrolyte film sandwiched between the anode and the cathode, and the single cells being sequentially stacked on each other through a separator plate provided with fuel flow channels on a first surface facing the anode for supplying a fuel fluid to the anode and oxidant flow channels on a second surface opposite to the first surface and facing the cathode for supplying an oxidant fluid to the cathode,
   wherein the fuel flow channels are continuous on the first surface from a fuel supply opening to a fuel exhaust opening; and t he oxidant flow channels are continuous on the second surface from an oxidant supply opening to an oxidant exhaust opening, and
   wherein only one communicating hole is provided at a downstream side with respect to a middle portion of the fuel flow channel of the separator plate, said communicating hole communicating with the fuel flow channel of another separator plate.

2. A fuel cell according to claim 1, wherein a cross sectional area of the flow channel at a downstream side with respect to the communicating hole in the separator plate is smaller than a cross sectional area of the flow channel at an upstream side.

3. A fuel cell according to claim 1, wherein an area of the anode supplied with the fuel flowing through the fuel flow channels at a downstream side with respect to the communicating hole in the separator plate is smaller than an area of the anode supplied with the fuel flowing through the fuel flow channels at an upstream side.

4. A fuel cell according to claim 1, wherein the fuel flow channels at a downstream side with respect to the communicating hole in the separator plate are arranged on a projected surface of the oxidant flow channels at downstream region.

5. A fuel cell comprising:
   a laminate of single cells, each of the single cells including an anode, a cathode, and an electrolyte film sandwiched between the anode and the cathode, and the single cells being sequentially stacked on each other through a separator plate provided with fuel flow channels on a first surface facing the anode for supplying a fuel fluid to the anode and oxidant flow channels on a second surface opposite to the first surface and facing the cathode for supplying an oxidant fluid to the cathode, wherein:
      a through hole passing through the laminate is provided at a centrobaric position within a surface of the electrode;
      a shaft is inserted in the through hole;
      a ring-shaped elastic body with an area of 20 to 80% of an area of the electrode is provided around completely surrounding the shaft; and a compressive surface pressure is applied between both end portions of the laminate with the shaft as an axis to fasten the laminate.

6. A fuel cell according to claim 5, wherein the communicating hole is provided at the centrobaric position within the surface of the electrode and is made the through hole passing through the laminate.

7. A fuel cell according to claim 5, wherein a midway portion of the fuel or oxidant flow channels of the separator plate is provided with a communicating hole communicating with the flow channels of another separator plate for the same kind of fluid.

8. A fuel cell comprising:

a laminate of single cells, each of the single cells including an anode, a cathode, and an electrolyte film sandwiched between the anode and the cathode, and the single cells being sequentially stacked on each other through a separator plate provided with fuel flow channels for supplying a fuel fluid to the anode and an oxidant flow channels for supplying an oxidant fluid to the cathode, wherein a midway portion of the flow channels of the separator plate is provided with a communicating hole communicating with the flow channels of another separator plate for a same kind of fluid, so that on the way of reactions of the fuel fluid and the oxidant fluid, the same kind of fluids flow into each other through the communicating hole, wherein a cross sectional area of the flow channel at a downstream side with respect to the communicating hole in the separator plate is smaller than a cross sectional area of the flow channel at an upstream side.

9. A fuel cell comprising:

a laminate of single cells, each of the single cells including an anode, a cathode, and an electrolyte film sandwiched between the anode and the cathode, and the single cells being sequentially stacked on each other through a separator plate provided with fuel flow channels for supplying a fuel fluid to the anode and an oxidant flow channels for supplying an oxidant fluid to the cathode, wherein a midway portion of the flow channels of the separator plate is provided with a communicating hole communicating with the flow channels of another separator plate for a same kind of fluid, so that on the way of reactions of the fuel fluid and the oxidant fluid, the same kind of fluids flow into each other through the communicating hole, wherein an area of the anode supplied with the fuel flowing through the fuel flow channels at a downstream side with respect to the communicating hole in the separator plate is smaller than an area of the anode supplied with the fuel flowing through the fuel flow channels at an upstream side.

* * * * *